Figure 1:
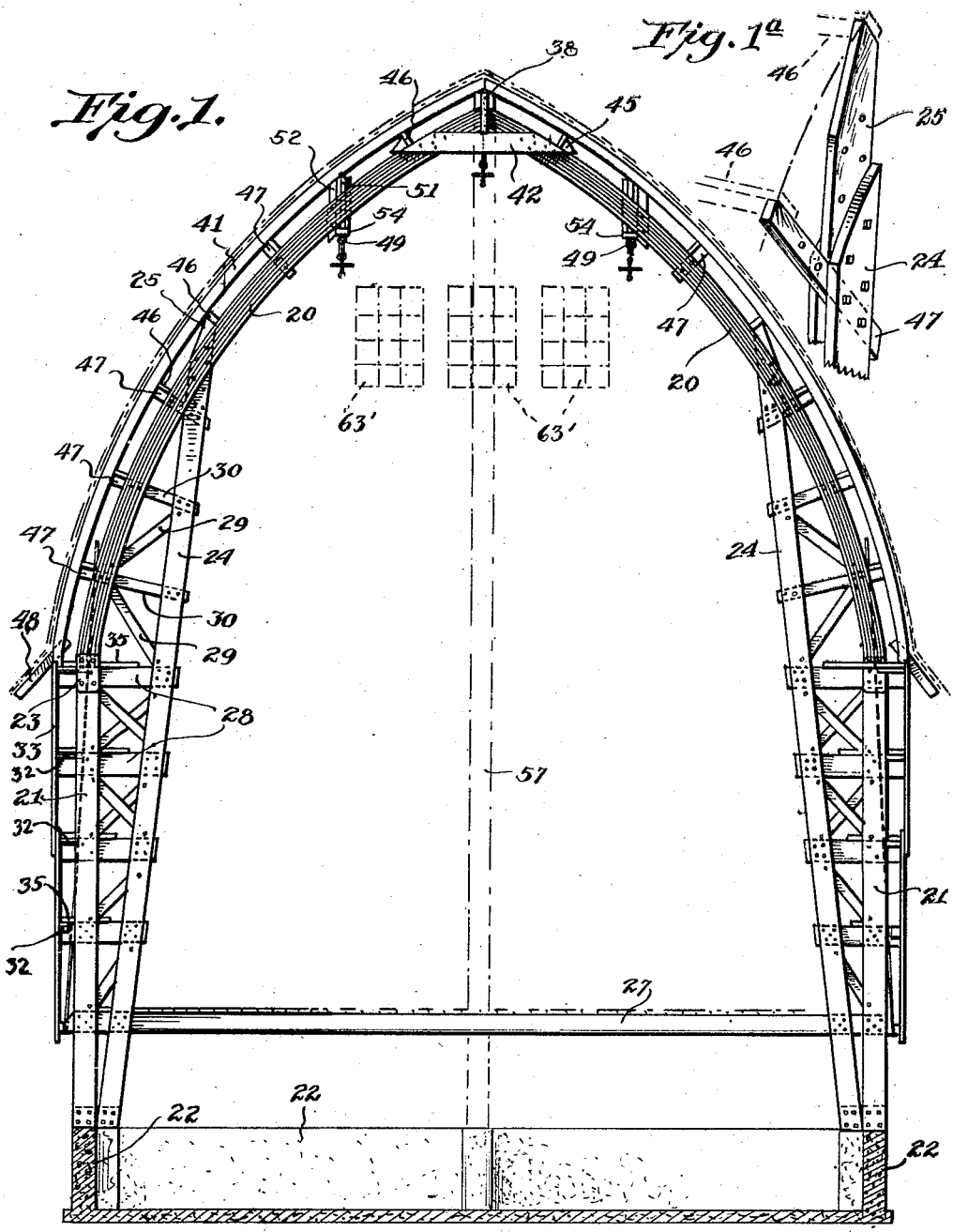

July 1, 1930.  F. H. RICHARDS  1,768,861
BARN AND OTHER BUILDING
Filed Feb. 10, 1927  5 Sheets-Sheet 3
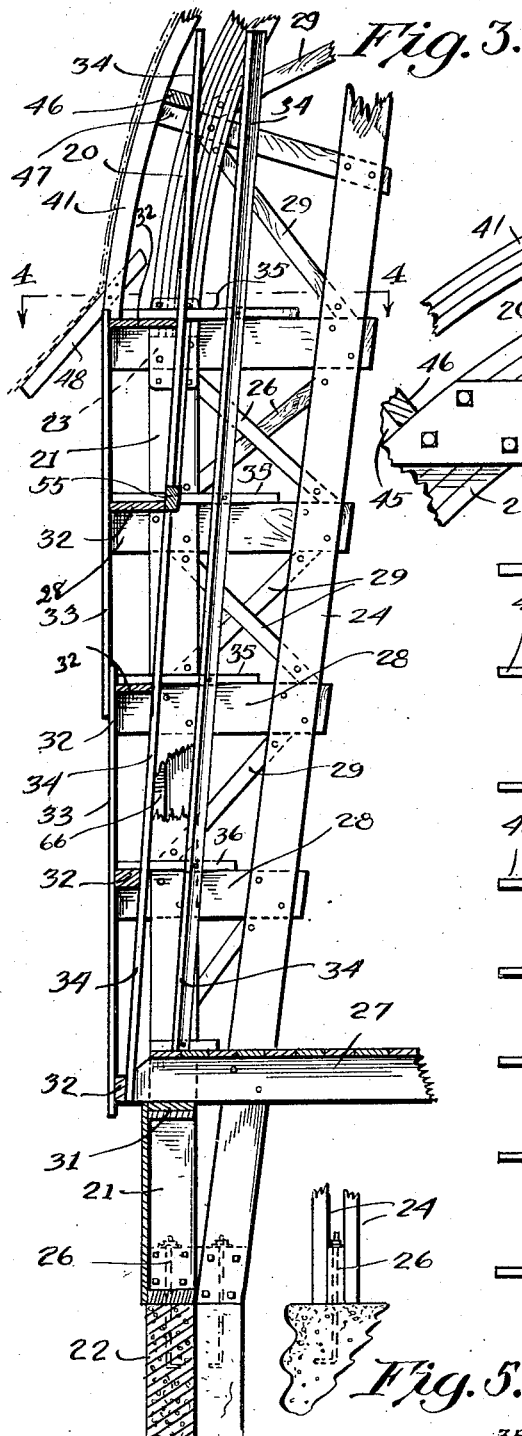
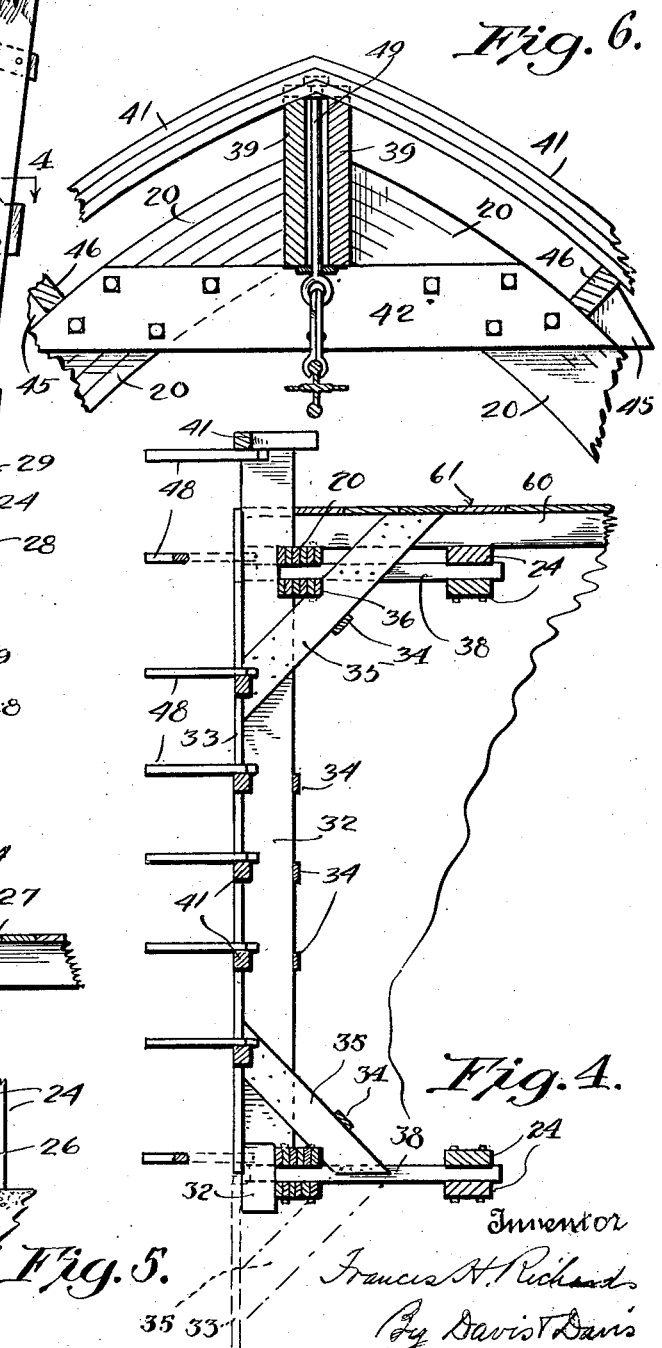
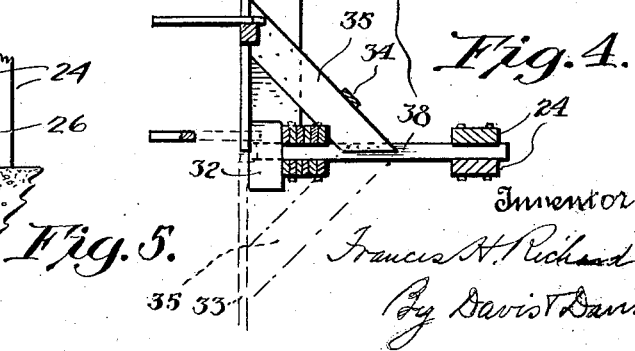

July 1, 1930.  F. H. RICHARDS  1,768,861
BARN AND OTHER BUILDING
Filed Feb. 10, 1927   5 Sheets-Sheet 4
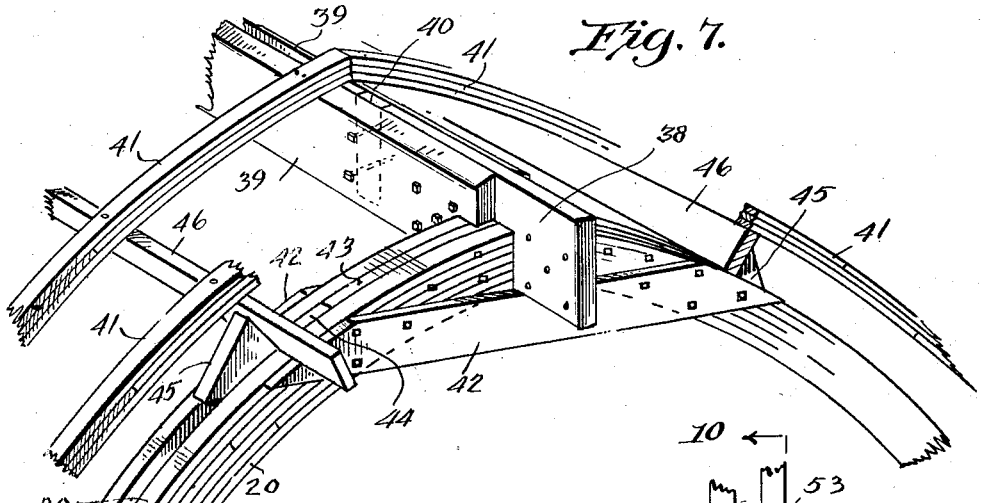
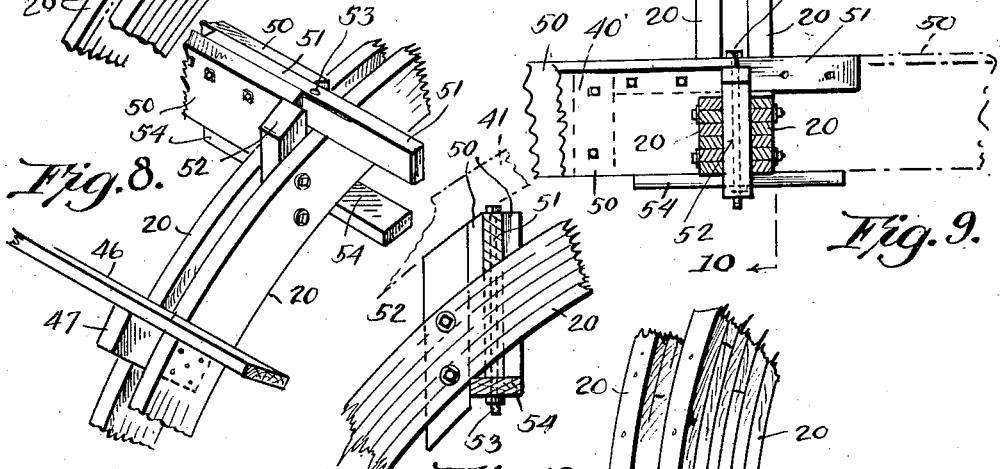
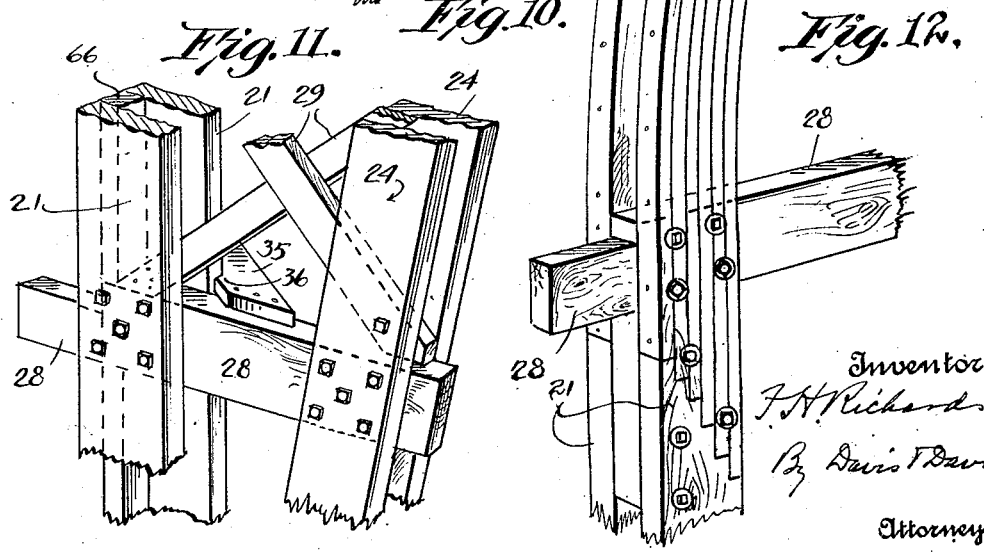

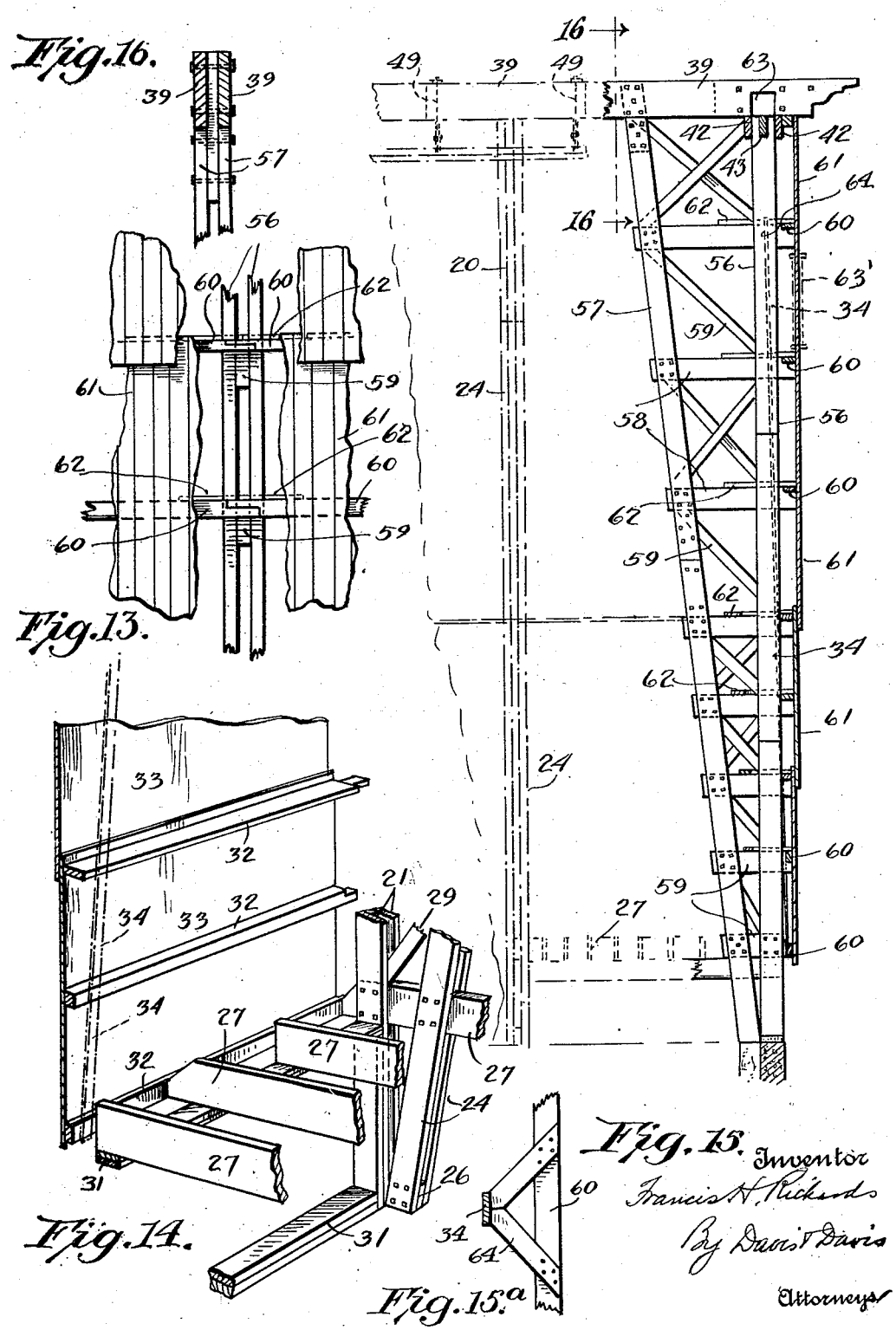

Patented July 1, 1930

1,768,861

UNITED STATES PATENT OFFICE

FRANCIS H. RICHARDS, OF BRYN MAWR, PENNSYLVANIA

BARN AND OTHER BUILDING

Application filed February 10, 1927. Serial No. 167,198.

Many of the features of this invention are applicable to the Gothic type of barn, and in general the objects of the invention are to provide a strong, sturdy structure adapted to withstand external wind pressure and so constructed as to eliminate to a great degree the bulging pressure of crops such as hay, etc., stored in bulk in the barn; to provide for thorough ventilation in all conditions of climate and temperature without permitting the entrance of rain, etc.; to provide a ridge structure which will enable a plurality of track-hangers to be provided to thereby permit proper distribution of the crops within the barn and also to shorten the time of storing the crops; and to generally improve and simplify the structure to the end that the cost of materials as well as labor shall be reduced to a minimum, as more fully hereinafter set forth.

In the drawings

Fig. 1 is a vertical transverse sectional view of a barn constructed in accordance with my invention;

Figs. 1ª to 16, inclusive, illustrate details of construction hereinafter particularly described.

Referring to the drawings annexed by reference-characters, 20 designates the arch-beams, each adjacent pair of which forms a Gothic arch, a suitable ridge-pole structure hereinafter described being employed at the upper, abutting ends of the beams. As many pairs of these arch-beams are employed as the length of the barn requires. Each arch-beam is supported at its lower end upon the upper end of one of the wall-posts 21 whose foundation-ends are supported on a suitable foundation 22, the adjoining ends of these posts and the arch-beams being fastened together by side-plates 23. The posts 21 and the arch-beams 20 are desirably made double, with a space between, the members being rigidly secured together in a manner hereinafter set forth.

Double truss-posts 24 extend from the foundation 22, obliquely upwardly and inwardly, to the arch-beams, where their ends are rounded off to fit against the concave surfaces of the arch-beams, these upper ends being rigidly fastened to the arch-beams by means of a tongue-beam 25 passing between the members of the truss 24 and extending up into the space between the arch-beams, these tongue-beams being fastened to plates between the members of the arch-beams by suitable nails or bolts. The lower ends of the truss-beams 24 as well as the lower ends of the posts 21 are bolted to a bar 26 which is anchored to the foundation 22. The truss is further fastened and braced to the posts, at intervals, between the barn-floor-joists 27 and the connection with the arch-beams by means of horizontal braces 28 bolted in spaces between the members of the posts and the trusses. Further bracing is accomplished by the oblique braces 29 extending between the trusses and the posts as well as between the trusses and the arch-beams. Radial braces 30 extend between the trusses and the arch-beams, to thereby complete a rigid bracing structure between each truss-beam and its companion arch structure.

The floor-joists 27 rest on sills 31 and the end of every other joist, as shown in Fig. 14, is extended to form a support for the lowermost horizontal girt 32, this girt being thereby set away from the sill 31 to thereby form open spaces for the upward entrance of ventilating air. The outer ends of the horizontal braces 28 are extended beyond the posts 21 to form supports for the additional horizontal girts 32, to which the outer wall-sheathing 33 is attached, the lower edge of this sheathing depending to a point below the lowermost girt 32 in order to insure against rain beating into the ventilating-openings between the ends of the joists.

Nailed to the inner edges of the girts 32 is a series of upright crib-slats 34 which serve to receive the thrust of the crops, such as hay, etc., stored on the floor in bulk. The girts increase in width upwardly, each succeeding girt being a little wider than the next lower one, to thereby insure an upward, inward inclination to the crib-slats. In each corner formed by the post structure and the wall of the barn is placed one of these crib-slats, inclined in the same manner as the other crib-slats. This inclination is obtained by securing the corner crib-slats to the inner edge of diagonal braces 35 extending from the braces 28 to the girts, their ends being firmly nailed to said braces and to said girts and their intermediate edges being notched at 36 to receive the adjacent corners of the wall-posts 21. The uppermost diagonal members 35, being positioned just above the upper ends of the posts 21, will have their notches engaged in the adjacent corners of the arch-beams 20, at their extreme lower ends. This downward inclination of the crib-slats, together with the downward inclination of the truss-posts 24 insures against undue outward bulging strains on the wall structure of the barn by reason of the mass of hay, etc. stored in the barn bulging outwardly against the wall structure as the mass settles down in time. With the usual construction now in use, as the mass of hay, alfalfa, wheat in bundles, bean vines, or whatever crops are stored in bulk on the floor of the barn, settles down in time, it bulges outwardly against the walls of the barn and subjects the walls to extreme bulging strains; I do away with this bulging strain by the arrangement of crib-slats described, which arrangement insures the mass being compacted centrally to thus prevent it bulging outwardly toward its base.

The braces 35 are further advantageous in that they solidly brace the wall structure against wind pressure, being assisted, of course, not only by the truss-posts 24 but also by the plurality of girts 32. This resistance to wind pressure is further augmented by extending the lower ends of the posts 21 and the truss-posts 24 to a point below the floor-joists 27 and the bolting of these members to said joists, and, still further, by the horizontal braces 28 as well as the diagonal braces 29, this structure providing a wall structure which is so rigid that it may be made of beams and bars of minimum dimensions.

It will be observed in Fig. 13 that the adjoining ends of the girts are overlapped on the horizontal braces 28, their overlapping ends being suitably scarfed or notched out to fit. Instead of fastening the laminated lower ends of the arch-beams 20 to the posts 21 by means of overlapping plates 23, I may, as shown in Fig. 12, step these ends into the stepped upper ends of the posts 21. It will be understood also that the slats composing the laminated arch-beams will be so arranged as to break the joints, to thus insure the necessary strength to these arch-beams. I prefer the use of laminated or built-up arch-beams because I am thereby enabled to employ less expensive lumber in constructing these beams.

The ridge-pole structure consists of short beams 38, one of which is fastened between the upper ends of each pair of arch-beams 20, keystone fashion, this beam being nailed to the abutting ends of the arch-beams in any suitable manner, preferably during the building-up of the laminated arch-beams. Each arch structure, including its pair of arch-beams 20 and its posts 21 with its truss structure, is put together on the ground and thereafter swung up into upright position with the lower ends of the structure serving as pivots. The adjacent projecting ends of the coupling beams 38 are connected together by a double ridge-beam 39, the ends of the two members being clamped to the opposite sides of the projecting ends of beam 38 by means of bolts. This leaves a space between the two members 39 extending from one of the coupling pieces 38 to the other; for purposes of bracing the two members 39 one or more spacing-blocks 40 may be bolted between the members. When thus constructed, it will be observed that the members 39 and 38 constitute a continuous ridge-beam extending the full length of the barn. The ends of the beams 39 are notched out to fit over upon the upper surface of the arch members 20—20, the adjacent ends of pairs of the beams 39 coming practically into abutting relation on the central line of each arch. The upper edges of the beams 38, 39 extend above the upper surfaces of the arch members 20 so that when the roof rafters 41 are fastened in place, with their upper ends upon the top edges of the beams 38—39, there will be ample ventilating space between the arch members and the roof.

In erecting the ridge-beams, the double beams 39, properly fastened together through the medium of the spacing-blocks 40, are elevated to the top of the barn and put into place and bolted to the members 38 after the arches are positioned, it being contemplated that the arches will be held in proper relation to each other by temporary means until the ridge-beams are permanently bolted into place.

To further strengthen the ridge structure, I fasten upon the opposite sides of the members 20 the horizontal braces 42, arranged close under the projecting ends of the coupling-beams 38, and, to still further brace the ridge structure, I fasten between the upper ends of the arch members 20 approximately-triangular filler-blocks 43 and also a horizontal beam 44 which extends from one arch member to the other, underneath the coupling-beam 38, in parallelism with the braces 42, the outer ends of these beams 44 being provided with upstanding shoulders 45 against which the longitudinal roof-joists 46 rest. The remainder of the roof-joists 46 are supported by and fastened to blocks 47 bolted between the members 20 and projecting thereabove sufficiently far to form a support for the joists. The usual exterior roof-covering is fastened to the rafters 41 and it extends downwardly on either side far enough to overlap the upper ends of the side-sheathing 33, the lower edges of the covering sheet or members being supported upon and attached to suitable downwardly-and-outwardly-projecting eaves-beams 48 whose upper, inner ends are fastened to the rafters 41. It will be observed that several of the outwardly-projecting blocks 47 are in the form of extensions of the brace-beams 30.

One object in making the main part of the ridge structure of companion beams 39 with a vertical space between is that it affords a convenient and very effective facility for attaching the rods 49 of the central track-hanger to the ridge structure, these rods being passed upwardly between the beams and being anchored therebetween in any suitable manner. With this structure, the hanger-rods may be readily spaced at suitable intervals along the ridge structure after the barn is erected. In large barns, it is desirable to provide for two additional tracks. My structure enables me to provide for these additional tracks very conveniently, one being arranged at either side of the central ridge-beam. I make these hanger-supports substantially in the same manner as the ridge-beam, that is, of two separated beams 50, as shown particularly in Figs. 8, 9 and 10, whose ends are clamped upon the opposite faces of the projecting ends of a coupling-beam 51 which rests upon the upper surfaces of the arch-members 20, downward sliding on the arch-members being provided against by thrust-blocks 52 bolted between the arch-members 20. This structure is held in place at each arch-member by a vertical bolt 53 extending down through the coupling-beam 51 and through a beam 54 which the bolt clamps in transverse position against the lower edges of the members 20 and 50. The separated members 50 may be braced with respect to each other by means of spacing-blocks similar to the blocks 40 in the main ridge-beam. It will be observed that these two supplemental track-hanging beams may be readily put in place after the arches are erected and connected up by the ridge-beam. The hanger-rods for these supplemental hanger-beams are put in position in the same manner as they are in the main ridge-beam. By thus providing a plurality of tracks for the loading and unloading devices, it will be observed that the crops may be distributed within the barn in the most advantageous way and also may be removed therefrom in the most economical manner.

Figure 2:
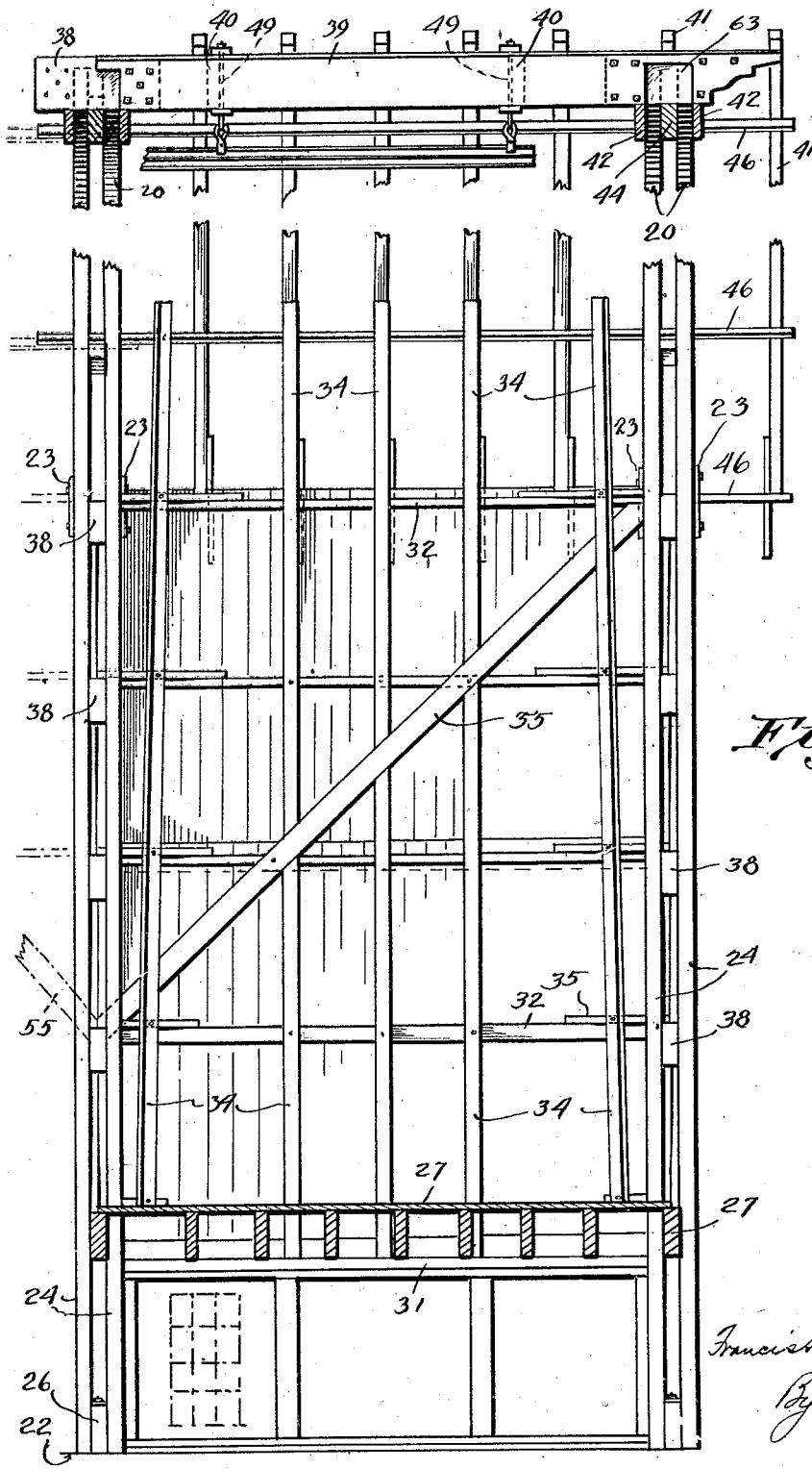

The crib sections of the side wall may be braced in any suitable manner by means of diagonal braces 55, shown in Fig. 2. The end-walls of my barn may be constructed in any suitable manner. I show one way of constructing these end-walls in Fig. 15, which represents a vertical sectional view of the end-wall extending from the ridge-beam to the foundation 22. A vertical wall-post 56 extends from the foundation to the arch-members 20, and this post is braced to the arch-beams by means of a brace-beam 57 whose upper end is connected to the ridge-beam. This brace or truss 57 inclined upwardly and inwardly so as to thereby not only brace the end-wall structure, but to also prevent pressure of the hay or other mow bulging the end-wall structure. This bracing-post 57 is connected to the wall-post 56 at intervals by horizontal brace-beams 58 which are in turn braced with respect to each other by a suitable number of diagonal braces 59. The outer end of the horizontal beams 58 project beyond the wall-post 56 so as to afford a support for the overlapping ends of the girts 60, which girts in turn afford a support for the end-wall-sheathing 61. Ventilating-windows 63' may be placed at any suitable place in the end-wall. This manner of arranging the girts 60 and the sheathing 61 affords ventilation at the end of the barn in the same manner as the side-wall-sheathing affords ventilation at the sides of the barn, the lowermost girt 60 being fastened to the ends of the lowermost brace 59 in the same manner as the lowermost girt 32 is fastened to the ends of the floor-joists 27 for the side-walls. The extreme ends of the ridge-beam 39 are extended beyond the end-wall, as shown in Fig. 15, to enable the roof-sheathing to be carried out beyond the end-wall. Also the ends of the roof-joists 46, as shown in Fig. 2, are similarly extended to receive one or more of the roof-rafters 41. These projecting ends of the ridge-beam and the roof-rafters afford convenient supports or hangers for use in the usual swinging apparatus that painters use in painting the walls. Diagonal braces 62, similar to the braces 35, may be used to brace the horizontal braces 58 with respect to the girts 60. I have shown but one of these end-wall-posts adapted to be arranged at the center of the end-wall structure, but it will be understood that in those cases where a central door is to be provided in the end of the barn, one of these structures will be arranged at each side of the center of the barn. Desirably, the beams 39 will be provided with sockets 63 in their opposite faces for the reception of the upper ends of those arch-members 20 which are located at the ends of the barn. The post 56 is desirably made of two beams, as is also the brace-post 57, so that the ends of the braces 58 and 59 may be solidly bolted therebetween.

Any suitable ventilating-outlets may be provided at the top of the barn; for instance, ventilating-windows 63', as shown in Fig. 1, in dotted lines, may be employed. It will be noted that the end-wall, shown particularly in Fig. 15, is provided with crib-slats 34, the girts 60 being increased in width progressively upwardly in order to give these slats the desired inclination. In view of the length of these end-wall crib-slats 34, the girts 60 toward the top of the barn need to be of considerable width and, therefore, in order to avoid the use of timbers of this great width, I piece-out these upper girts by means of extension-pieces 64 fastened to the girt in V-shape form, as shown in Fig. 15ª, the slat being fastened to the inner overlapped ends of these pieces 64. Another advantage of the use of the inclined brace 57, reaching to the top of the barn, is that it will be in position to act as a bumper or fender in case the loading-sling is run back too far, thus avoiding injury to the end-wall of the barn.

In order to take the shearing-strain off the bolts that fasten the horizontal braces 28 to the wall-posts 21, I fasten between the outer edges of the post-members 21 short intermediate posts or filling-pieces 66 whose upper ends abut against the under edges of the braces 28 and whose lower edges rest upon the upper faces thereof. In addition to strengthening the ridge-beam structure, the blocks 40, as particularly shown in Fig. 2, both in the main ridge-beam and the hanger-beams 50 may be so placed as to serve as abutments for the track-hanger-rods 40, thus preventing these rods from swaying or sliding on the beam. It will be observed that the crib-slats 34, in addition to functioning as heretofore set forth, serve also to tie the girts together and thus prevent sagging of the girts, it being obvious that it is important that the lower ends of the crib-slats shall be supported on the floor or other substantial part of the barn structure.

It will be observed also that my manner of supporting the roof proper (consisting of the roof-joists 46, rafters 41 and whatever roof-covering is employed) upon the projecting ends 47 throws practically the entire weight of the roof proper upon the arch-members 20, thereby relieving the side-walls (consisting of the girts 32, sheathing 33, etc.) from the excessive crushing strain that would result if the roof proper were supported on said wall structure.

What I claim as new is:

1. A building embodying a series of arch structures, each constructed of a pair of arch-members, a pair of wall-posts supporting the arch-members, a pair of braces each extending from the base of one post to a point on the adjacent arch-member, where it is secured to the arch-member, and lateral braces extending from each of said braces to the adjacent wall-post and the adjacent part of the arch-member, said lateral braces extending beyond the post and arch-member to afford supports for the exterior wall and roof members embodying longitudinal beams resting on said extensions.

2. A building embodying a series of arch structures, each constructed of a pair of arch-members and a pair of wall-posts, floor-joists attached to the wall-posts, the ends of a plurality of said joists extending beyond the posts, lateral braces attached to the posts and similarly extending beyond the outer sides of the posts, girts fastened to said projecting ends of the braces and the joists, and external wall-boards or sheathing fastened to said girts.

3. A barn embodying a series of arch structures, each constructed of a pair of arch-members and a pair of wall-posts, floor-joists attached to the wall-posts, the ends of a plurality of said joists extending beyond the posts, lateral braces attached to the posts and similarly extending beyond the outer sides of the posts, girts fastened to said projecting ends of the braces and the joists, and external wall-boards or sheathing fastened to said girts, said girts increasing in width successively upwardly and having fastened to their inner edges a plurality of crib-slats which incline upwardly and inwardly.

4. A barn embodying a series of arch structures, each constructed of a pair of arch-members and a pair of wall-posts, floor-joists attached to the wall-posts, the ends of a plurality of said joists extending beyond the posts, lateral braces attached to the posts and similarly extending beyond the outer sides of the posts, girts fastened to said projecting ends of the braces and the joists, external wall-boards or sheathing fastened to said girts, said girts increasing in width successively upwardly and having fastened to their inner edges a plurality of crib-slats which incline upwardly and inwardly, and diagonal braces extending from said lateral braces to said girts and having fastened to their inner edges crib-slats which incline similarly to the aforesaid crib-slats.

5. A barn embodying a series of arch structures, each constructed of a pair of arch-members and a pair of wall-posts, floor-joists attached to the wall-posts, the ends of a plurality of said joists extending beyond the posts, lateral braces attached to the posts and similarly extending beyond the outer sides of the posts, girts fastened to said projecting ends of the braces and the joists, external wall-boards or sheathing fastened to said girts, said girts increasing in width successively upwardly and having fastened to their inner edges a plurality of crib-slats which incline upwardly and inwardly, and diagonal braces extending from said lateral braces to said girts and having fastened to their inner edges crib-slats which incline similarly to the aforesaid crib-slats, said diagonal braces increasing in length successively upwardly and each being notched to fit over the adjacent corners of the wall-posts.

6. An arch structure for a building embodying two arch-beams, each of which is constructed of a pair of separated members, each member being built up of a plurality of slats laminæ fashion, outwardly-and-upwardly-projecting blocks fastened between said laminated members, joists mounted on the projecting ends of said blocks, and roof-supporting rafters supported on said joists.

7. An arch structure for buildings embodying two arch-members having fastened between their upper, apex ends a coupling-beam projecting laterally from the arch-members, and beams connecting the arch-members and lying under said projecting ends of the coupling-beam.

8. A barn embodying a plurality of arch structures, each embodying a pair of arch-members, a coupling-beam inserted between the upper ends of the arch-members and secured to the arch-members, the ends of this coupling-beam projecting laterally from the arches, and a pair of ridge-beam-members connecting the adjacent projecting ends of said coupling-members, these ridge-beam-members being separated from each other to leave a space for the track-hanger-rods.

9. A barn embodying a series of arch structures, each consisting of a pair of arch-beams having anchored between their upper ends a coupling-beam whose ends project laterally from the arch-members and whose upper edge projects above the arch-members, braces connecting the arch-members at a point below said coupling-member, and a pair of ridge-beam-members connecting the projecting ends of the coupling-members, the ends of these ridge-beam-members being notched to fit over the adjacent corners of the arch-members, these ridge-beam-members being separated from each other to provide an elongated slot or space for the track-hanger-rods.

10. A barn having an end-wall embodying a post extending from the foundation to the ridge-beam structure, a brace-post or beam extending from the base of said post upwardly and inwardly and having its upper end attached to said ridge-beam structure, and lateral braces connecting said inclined members to said post at intervals.

11. A barn having attached to the inner face of its wall a plurality of horizontal girts increasing in width successively upwardly, and crib-slats fastened to the inner edges of said girts, these slats inclining upwardly and inwardly and having their lower ends supported on the floor structure of the barn.

12. A building embodying a series of Gothic arches and posts supporting said arches, said arches being each made of a pair of spaced beams, projecting members fastened at intervals between said beams and projecting outwardly and upwardly from the outer surfaces of the arch-members, and a roof structure embodying horizontal joists resting upon the upper faces of said projections.

13. A building embodying a plurality of separated arches attached to and mounted upon a corresponding plurality of wall posts, each arch member being braced to its supporting wall-post by means of an upwardly and inwardly inclined bracing post, lateral braces connecting these inclined posts and arch members and wall posts and extending beyond the outer surface thereof, a plurality of roof members connecting said arch structures and resting upon said projecting ends of the braces, a plurality of arched rafters mounted upon said longitudinal members to afford a support for the roof covering, and wall sheathing fastened to the longitudinal members that are supported on the wall posts.

In testimony whereof I hereunto affix my signature.

FRANCIS H. RICHARDS.